Aug. 1, 1933.  J. E. LILIENFELD  1,920,799
SEAL FOR ELECTROLYTIC CONDENSERS
Filed July 25, 1929
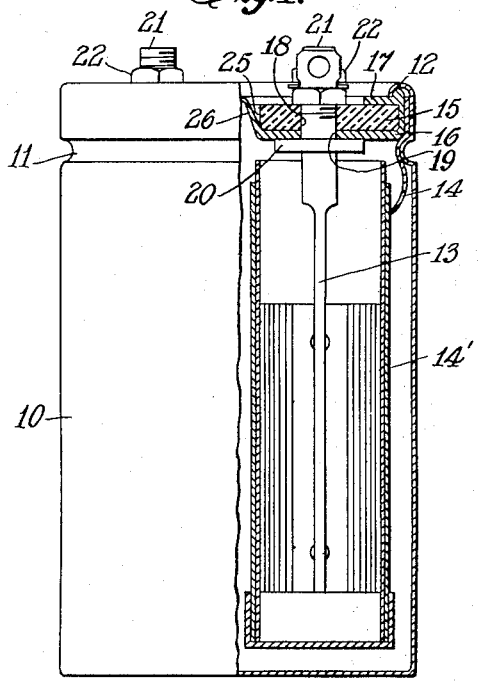
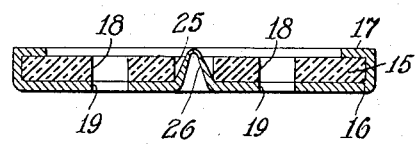
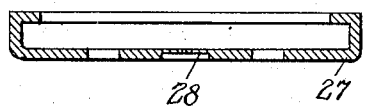
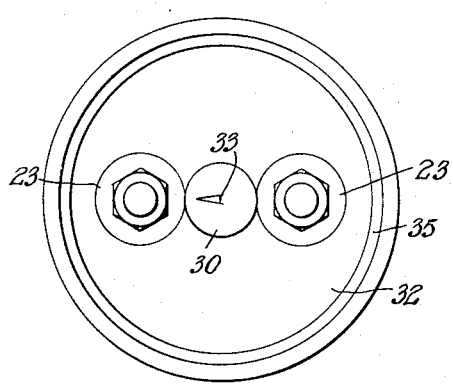
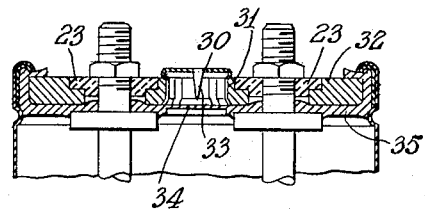
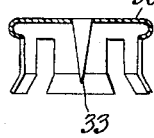
INVENTOR
JULIUS EDGAR LILIENFELD
BY
ATTORNEY Patented Aug. 1, 1933

1,920,799

UNITED STATES PATENT OFFICE 1,920,799

SEAL FOR ELECTROLYTIC CONDENSERS

Julius Edgar Lilienfeld, Winchester, Mass., assignor to The Amrad Corporation, Medford Hillside, Mass., a Corporation of Ohio Application July 25, 1929. Serial No. 380,844

10 Claims. (Cl. 175—315)

The invention relates to electrolytic condensers embodying a metallic shell for retaining the electrolyte, said shell constituting one of the electrodes of the condenser, and a suitable cover member for sealing the condenser and through which the other electrode or electrodes are brought; and the invention relates more especially to the novel construction and arrangement of this sealing member.

As heretofore constructed, these sealing members have not at all times maintained a sufficiently tight seal; and it is the object of the present invention to provide a novel sealing member which will at all times insure a tight seal and which sealing member, moreover, requires less parts and simplifies the installation of the electrodes. A further object of the invention resides in the construction of a sealing member which enables the cells to be transported initially with vent opening sealed as well as to provide for the convenient and ready opening of the vent when the cell is placed in operation. A still further object of the invention resides in means whereby this venting operation may be accomplished automatically and, also, whereby there will be provided at all times an ample vent for accommodating unusual gas pressures which may develop in the condenser under certain conditions.

In carrying out the invention, the usual shell for retaining electrolyte is provided, as of a metal shell having also the rolled-in bead or inwardly directed ledge for supporting the cover member which is held in place by crimping or turning over the upper edge of the shell over said cover member.

This cover member is designed to support the other electrode or electrodes of the condenser and, in accordance with the invention, is composed of two elements—one a rigid element or disk of insulating material or metal, while the other consists of a cap of insulating material of a resilient or elastic nature forming a "cap type" seal in contradistinction to the usual type of seal embodying a multiplicity of individual gaskets. The cap is designed to envelop entirely the bottom and sides of the rigid disk and is provided with an in-turned flange extending over the top or outer face of said disk and designed to coact with the crimped edge of the shell to clamp the entire cover member between said edge and the inwardly directed support of the shell so as to form a seal between said crimped edge and the flange, thereby securely sealing the entire condenser. Registering perforations are provided respectively in the disk and cap to admit therethrough an electrode or electrodes arranged to be clamped thereto in any well-known or special manner to be sealed by the base of the cap. Moreover, there is provided a vent opening in the disk which is arranged to cooperate with a rupturable portion of the base of the cap and this may be accomplished manually or automatically, as will hereinafter be more fully set forth.

The nature of the invention, however, will best be understood when described in connection with the accompanying drawing, in which:

Fig. 1 is a front elevation and part vertical section of an electrolytic condenser comprising the novel type of cover member.

Fig. 2 is a vertical section of the novel cover member with electrodes removed.

Fig. 3 is a similar view illustrating a modification.

Fig. 4 is a plan view and Fig. 5 a fragmentary vertical section illustrating the novel cover member provided with means for rupturing the portion of the cap element of the cover member; and illustrates, also, the arrangement wherein the disk element is composed of metal.

Fig. 6 is an enlarged vertical section of the metal vent cap employed in connection with the cap member.

Referring to the drawing, 10 designates a cell formed, for example, of a metal shell comprising one of the electrodes of the condenser and designed to retain a suitable electrolyte, the said shell being provided with an inwardly rolled bead or ledge providing a support 11. This support is designed to carry a cap member, hereinafter more fully described, which is held thereto by turning inwardly or crimping over the outer edge 12 of the metal shell, as indicated. The cap member aforesaid is designed to carry one or more electrodes 13 extending into the electrolyte; and where a plurality of these electrodes are employed a grounding tab 14 is connected with the electrode shields 14', and arranged to be connected in turn with the metal shell 10 (at negative or zero potential) as in extending the tabs to the top of the cap rather than turning the same under the crimping edge 12.

The cover member instead of being composed of a single rigid disk with individual washers for sealing the top of the container and of a separate device for venting the container for the electrodes, as has been the practice heretofore, comprises two elements only—the one element 15 being of rigid material as of insulation or of metal, in the latter instance provision being made to insulate the electrodes therefrom as hereinafter set forth.

The other element consists of a cap 16 of resilient or elastic material and having insulating properties, for example, rubber. This cap covers entirely the inner face or bottom of the disk 15 and is brought over the sides of said disk with an inwardly extending flange 17 which fits tightly over the top of the disk and is adapted to coact with the crimped-over edge 12 of the shell to clamp the cover member between said edge and the support 11 to effect thereby a seal of the condenser between the said edge and the flange.

In addition, suitable perforations 18 are provided in the disk 15 to register with perforations 19 in the bottom of the cap to admit an electrode through the cover member into the cell. It will be appreciated that this cap affords in an integral unit the gasket for sealing the top of the container, the gasket for the electrodes and a vent; and that when using an insulating rigid disk therewith no additional washer or any other expedient is necessary. A secure seal may thus be effected for the electrodes by providing an electrode with the flange 20 and drawing up said electrode through the threaded end 21 of its stem against the top of disk 15 by means of a nut 22. This will seal the inner electrodes, while the flange 17 of the cap serves to seal the cell as a whole, and more securely than in the type wherein a gasket is utilized since there is eliminated the possibility of leakage between the gasket and disk. If, on the other hand, the rigid disk is of metal, only insulating bushings 23, Figs. 4 and 5, have to be added in case the electrodes 10 and 13 are intended to be insulated from each other.

In order to secure a vent for the gases which may develop in the cell, a further opening 25 is provided through the disk 15, and the bottom of the cap may be brought therein as in the form of a weakened tubular projection or riser 26 extending therethrough to the top of the disk to be readily accessible and puncturable when it is desired to place the cell in action. Or, as shown in Fig. 3, the cap 27 may be provided at the bottom with a flat weakened portion 28 which may be readily pierced or will rupture automatically into the corresponding opening of the disk upon the application of sufficent pressure thereto from the interior of the cell. In the former embodiment, the opening made in the riser 26 (generally merely a pin hole) increases, though slowly, with increase of pressure developing in the cell, while in the case of a vent embodying the flattened weakened portion 28 the opening therein enlarges rapidly with such increase of pressure and is therefore more suitable inasmuch as it reduces the danger of explosion under abnormal operating conditions. The greater the area of the weakened portion, the more rapid will be the enlargement of the pin hole opening which, in absence of a pressure, remains closed due to the inherent resiliency of the material.

In the provision of such weakened portion of the sealing cap, it becomes possible to dispense entirely with any and all constricted passageways, as generally employed; and thus allows of accommodating excessive pressures which sometimes develop in the operation of these condenser cells.

The rupturing operation may also be accomplished positively and automatically as the pressure develops within the cell, said cell being normally sealed as is desirable for shipping purposes. For example, a metallic vent cap 30 having spring-fingers struck therefrom is designed to fit through the same into the opening 31 provided in the disk 32; and the cap has also a spur 33 struck therefrom and downwardly directed into said opening, the same being more or less of a blade form to rapidly rupture the weakened portion 34 of the base of cap 35 when the same is brought into contact therewith by the development of sufficient pressure within the cell and which may occur gradually or, under certain conditions, suddenly as through heating of the condenser. In case of excessive pressure thus developing, the weakened portion itself is of such a nature that a considerable opening would develop therein and prevent damage to the cell.

Where a plurality of electrodes are employed within the cell, the effect of any capacity existing therebetween is obviated by the provision of the grounding tabs; and proper contact therewith is insured by extending the tabs to the top of the cap member rather than turning the same under the crimping edge. This insures intimate contact with the shell as well as securely retaining the tab so that it will not work loose; moreover, it reduces appreciably the chance for leakage.

I claim:

1. In an electrolytic condenser having a metal shell affording a container for the electrolyte, adapted to be turned over at its upper edge and provided with an inwardly directed support below said edge: a sealing cover member for the condenser carried by said support and comprising a disk of rigid material, an enveloping cap of elastic material covering entirely the inner face and sides of the disk with inwardly turned flange extending partly over the outer face of the disk, the top edge of the cell being adapted to be crimped thereover to clamp the said cover member between it and the support to effect a seal therebetween, and the said disk and cap being provided with registering electrode perforations, and means to secure an electrode to the cover elements.

2. In an electrolytic condenser having a metal shell affording a container for the electrolyte, adapted to be turned over at its upper edge and provided with an inwardly directed support below said edge: a sealing cover member for the condenser carried by said support and comprising a disk of rigid material, an enveloping cap of elastic material covering entirely the inner face and sides of the disk with inwardly turned flange extending partly over the outer face of the disk member, the top edge of the shell being adapted to be crimped thereover to clamp the cover member between it and the said support to effect a seal therebetween, and the said disk and cap being provided with registering electrode perforations, means to secure an electrode to the cover elements, and a flexible grounding tab connected with the shield of an electrode and extending over the side of the cap to be held between the same and the shell.

3. In an electrolytic condenser having a metal shell affording a container for the electrolyte, adapted to be turned over at its upper edge and provided with an inwardly directed support below said edge: a sealing cover member for the condenser carried by said support and comprising a disk of rigid material, an enveloping cap of elastic material covering entirely the inner face and sides of the disk with inwardly turned flange extending partly over the outer face of the disk, the top edge of the cell being adapted to be crimped thereover to clamp the said cover member between it and the support to effect a seal therebetween, and the said disk and cap being provided with registering electrode perforations, a plurality of electrodes passing through the registering perforations provided therefor in the cover member and each having a flange for contacting with the base of the cap, and means at the top of the cover member to draw said flange against the cap base to form a seal thereat.

4. In an electrolytic condenser having a metal shell affording a container for the electrolyte, adapted to be turned over at its upper edge and provided with an inwardly directed support below said edge: a sealing cover member for the condenser carried by said support and comprising a disk of rigid material and an enveloping cap of elastic material covering entirely the inner face and sides of the disk with inwardly turned flange extending partly over the outer face of the disk, the top edge of the cell being adapted to be crimped thereover to clamp the said cover member between it and the support to effect a seal therebetween, and the said disk and cap being provided with registering electrode perforations, means to secure an electrode to the cover elements, and a vent opening provided in the disk cooperating with a rupturable portion of the base of the cap.

5. In an electrolytic condenser having a metal shell affording a container for the electrolyte, adapted to be turned over at its upper edge and provided with an inwardly directed support below said edge: a sealing cover member for the condenser carried by said support and comprising a disk of rigid material, an enveloping cap of elastic material covering entirely the inner face and sides of the disk with inwardly turned flange extending partly over the outer face of the disk, the top edge of the cell being adapted to be crimped thereover to clamp the said cover member between it and the support to effect a seal therebetween, and the said disk and cap being provided with registering electrode perforations, means to secure an electrode to the cover elements, and a vent opening provided in the disk cooperating with a rupturable portion of the base of the cap, the portion of the cap cooperating with the vent opening being of reduced thickness.

6. In an electrolytic condenser having a metal shell affording a container for the electrolyte, adapted to be turned over at its upper edge and provided with an inwardly directed support below said edge: a sealing cover member for the condenser carried by said support and comprising a disk of rigid material, an enveloping cap of elastic material covering entirely the inner face and sides of the disk with inwardly turned flange extending partly over the outer face of the disk, the top edge of the cell being adapted to be crimped thereover to clamp the said cover member between it and the support to effect a seal therebetween, and the said disk and cap being provided with registering electrode perforations, means to secure an electrode to the cover elements, a vent opening provided in the disk cooperating with a rupturable portion of the base of the cap, said portion being of reduced thickness, and means carried by the disk to pierce automatically said rupturable portion as sufficient gas pressure develops in the condenser to direct said rupturable portion into contact therewith.

7. In an electrolytic condenser having a metal shell affording a container for the electrolyte, adapted to be turned over at its upper edge and provided with an inwardly directed support below said edge: a sealing cover member for the condenser carried by said support and comprising a disk of rigid material, an enveloping cap of elastic material covering entirely the inner face and sides of the disk with inwardly turned flange extending partly over the outer face of the disk, the top edge of the cell being adapted to be crimped thereover to clamp the said cover member between it and the support to effect a seal therebetween, and the said disk and cap being provided with registering electrode perforations, means to secure an electrode to the cover elements, a vent opening provided in the disk cooperating with a rupturable portion of the base of the cap, said portion being of reduced thickness, and an open vent plug having a sharpened portion adapted to puncture the rupturable portion as sufficient gas pressure develops in the condenser to direct said rupturable portion into contact therewith.

8. In an electrolytic condenser having a metal shell affording a container for the electrolyte, adapted to be turned over at its upper edge and provided with an inwardly directed support below said edge: a sealing cover member for the condenser carried by said support and comprising a disk of rigid material, an enveloping cap of elastic material covering entirely the inner face and sides of the disk with inwardly turned flange extending partly over the outer face of the disk, the top edge of the cell being adapted to be crimped thereover to clamp the said cover member between it and the support to effect a seal therebetween, and the said disk and cap being provided with registering electrode perforations, means to secure an electrode to the cover elements, a vent opening provided in the disk cooperating with a rupturable portion of the base of the cap, said portion being of reduced thickness, and an open vent plug removably fitted into the disk and having a sharpened portion adapted to puncture the rupturable portion as sufficient gas pressure develops in the condenser to direct said rupturable portion into contact therewith.

9. An electrolytic condenser including a receptacle, an apertured cover for said receptacle fitting within the inner wall surface thereof and a flexible apertured diaphragm closing the aperture of said cover, the apertures of said diaphragm being normally closed by the resiliency of the material, said diaphragm being positioned for flexing movement by pressure whereby the apertures thereof will be opened upon subjection of the diaphragm to pressure, said diaphragm extending over the edges of said cover and against the inner wall surfaces of the receptacle to form a gas-tight gasket therebetween.

10. An electrolytic condenser including a receptacle, an apertured cover therefor, a normally closed breather diaphragm associated with said cover, said diaphragm extending over the edges of said cover and being crimped thereto by said receptacle, and electrodes extending through said cover and supported thereby.

JULIUS EDGAR LILIENFELD.